(12) United States Patent
Nichols

(10) Patent No.: US 12,330,757 B2
(45) Date of Patent: Jun. 17, 2025

(54) BOAT SHELLS WITH WATERPROOF LAYER THEREBETWEEN

(71) Applicant: Scott L. Nichols, Hamilton, MI (US)

(72) Inventor: Scott L. Nichols, Hamilton, MI (US)

( * ) Notice: Subject to any disclaimer, the term of this patent is extended or adjusted under 35 U.S.C. 154(b) by 498 days.

(21) Appl. No.: 17/936,221

(22) Filed: Sep. 28, 2022

(65) Prior Publication Data

US 2023/0100528 A1 Mar. 30, 2023

Related U.S. Application Data

(60) Provisional application No. 63/261,740, filed on Sep. 28, 2021.

(51) Int. Cl.
| | |
|---|---|
| *B63B 5/10* | (2006.01) |
| *B32B 21/04* | (2006.01) |
| *B63B 1/04* | (2006.01) |
| *B63B 3/46* | (2006.01) |
| *B63B 3/48* | (2006.01) |

(52) U.S. Cl.
CPC .............. *B63B 5/10* (2013.01); *B32B 21/045* (2013.01); *B63B 1/04* (2013.01); *B63B 3/46* (2013.01); *B63B 3/48* (2013.01); *B32B 2255/02* (2013.01); *B32B 2255/26* (2013.01); *B32B 2307/7265* (2013.01); *B32B 2605/12* (2013.01)

(58) Field of Classification Search
CPC .... B63B 1/04; B63B 3/46; B63B 3/48; B63B 5/024; B63B 5/10; B63B 21/02; B63B 21/045; B63B 21/10; B63B 25/00; B63B 73/40; B63B 2255/02; B63B 2255/26; B63B 2307/7265; B63B 2605/12

USPC .................................. 114/56.1, 69, 352, 355
See application file for complete search history.

(56) References Cited

U.S. PATENT DOCUMENTS

| | | | |
|---|---|---|---|
| 1,333,109 A | 3/1920 | Ford | |
| 1,353,880 A * | 9/1920 | Widing | ..................... B63B 5/16 114/65 A |
| 1,895,380 A | 1/1933 | Elling | |
| 1,916,486 A | 7/1933 | Miller | |
| 2,964,764 A | 12/1960 | Hickson | |
| 3,080,267 A * | 3/1963 | Schmalz | ............. B29C 44/1242 264/46.7 |
| 3,092,850 A * | 6/1963 | Klopstock | ................. B63B 5/10 114/358 |
| 3,611,458 A | 10/1971 | Gonzalez | |
| 3,768,107 A | 10/1973 | Donoughe | |
| 3,984,887 A | 10/1976 | Tanemoto | |
| 4,290,157 A | 9/1981 | Jensen, Jr. | |
| 4,522,143 A | 6/1985 | Holzbaur | |
| 4,706,597 A | 11/1987 | Figone | |
| 4,829,926 A | 5/1989 | Voelkel | |

(Continued)

OTHER PUBLICATIONS

Safar, A., Edwards, J., Ward, M. (Oct. 1, 2020). Home. Seahopper. Retrieved Sep. 16, 2022, from https://www.seahopperfoldingboats.com/.

*Primary Examiner* — Daniel V Venne
(74) *Attorney, Agent, or Firm* — Dunlap Bennett & Ludwig, PLLC; Anna L. Kinney

(57) ABSTRACT

A boat includes an inner hull layer an outer hull layer. Each layer includes a deck, a starboard side, a port side, and a stern. Each layer is assembled from flat sections. The boat further includes a waterproof layer located between the inner and outer hull layers. Each layer can be disassembled for boat storage purposes.

4 Claims, 4 Drawing Sheets

(56) References Cited

U.S. PATENT DOCUMENTS

| | | | |
|---|---|---|---|
| 5,615,634 A | 4/1997 | Gonda | |
| 6,540,954 B1 * | 4/2003 | Kramers | B29C 70/304 |
| | | | 264/258 |
| 6,860,221 B1 | 3/2005 | Henderson | |
| 7,568,444 B2 | 8/2009 | Espeseth et al. | |
| 7,963,243 B2 | 6/2011 | Quigley | |
| 8,783,203 B1 | 7/2014 | Woods | |
| 9,061,734 B2 | 6/2015 | Kaye | |
| 9,808,072 B2 | 11/2017 | Maybin | |
| 10,472,021 B2 | 11/2019 | Jin et al. | |

* cited by examiner

BOAT SHELLS WITH WATERPROOF LAYER THEREBETWEEN

CROSS-REFERENCE TO RELATED APPLICATION

This nonprovisional application is based upon and claims the benefit of priority of US provisional application Ser. No. 63/261,740, filed Sep. 28, 2021, incorporated by reference herein in its entirety.

FIELD

The present subject matter relates to watercraft assembled for use and disassembled when not used and, more particularly, to a watercraft such as a boat having an outer shell, an inner shell, and a waterproof layer therebetween, wherein the inner and outer shells are assembled for use and are disassembled when stored.

BACKGROUND OF THE INVENTION

Traditionally constructed boats requiring a large amount of storage space, are often stored in an owner's garage or driveway, and must be transported by trailer to water. Nontraditional boats, often made of plastic, possibly able to reduce storage volume by a feature enabling folding the sides in on the bottom or by another feature enabling fastening two or more individual watertight sections together, often result in bulky structures when collapsed. Moreover, folding boats retaining their full length or width when collapsed are often deemed too long for easy handling and/or transport. In nested designs, while length can be reduced, the volume of individual boat units is maintained. Furthermore, nested designs are generally limited in size to a length that can be handled, usually about 8-10 feet. Many people choose boats at least in part for their beauty, often resulting in the purchase of boats that are aesthetically pleasant to behold, and which results in the shunning of nontraditional boats that emphasize boat functionality over form, because they are aesthetically undesirable.

As can be seen, there is a need for aesthetically pleasing boats and other watercraft which, when disassembled, are easily handled, transported, and stored when not in use, and which are easily re-assembled for use on water, when desired.

SUMMARY OF THE INVENTION

One aspect or feature of the present subject matter is directed to a boat comprising an inner layer, an outer layer, and a waterproof layer between the inner layer and the outer layer. The inner layer includes an upper deck, an inner starboard side, an inner port side, and an inner stern or transom. The outer layer includes a lower deck, an outer starboard side, an outer port side and an outer stern or transom.

Another aspect or feature of the present subject matter is directed to a boat dimensioned and configured to include a deck, a port and starboard side, and a stern or transom. The boat includes a plurality of sections dimensioned and configured to be assembled and joined together whenever desired. The sections are dimensioned and configured to be disassembled, to enable transporting and/or storing the boat.

This boat has the appearance and function of a traditional boat yet breaks down into easily handled individual pieces when not in use. This boat is not folded. The individual pieces lay flat and may be stacked, reducing the storage volume to a fraction of the assembled volume, and may be transported in the back of a truck or SUV. For example, a 16' long boat as described herein may be disassembled to parts that fit in the back of a commercially available SUV.

These and other aspects, features, and advantages of the present subject matter will be better understood after referring to the following drawings, description, and claims.

BRIEF DESCRIPTION OF THE DRAWINGS

Throughout the drawing figures and detailed description, similar reference numerals shall be used to refer to similar components of the present subject matter.

DETAILED DESCRIPTION OF THE INVENTION

Figure 1:
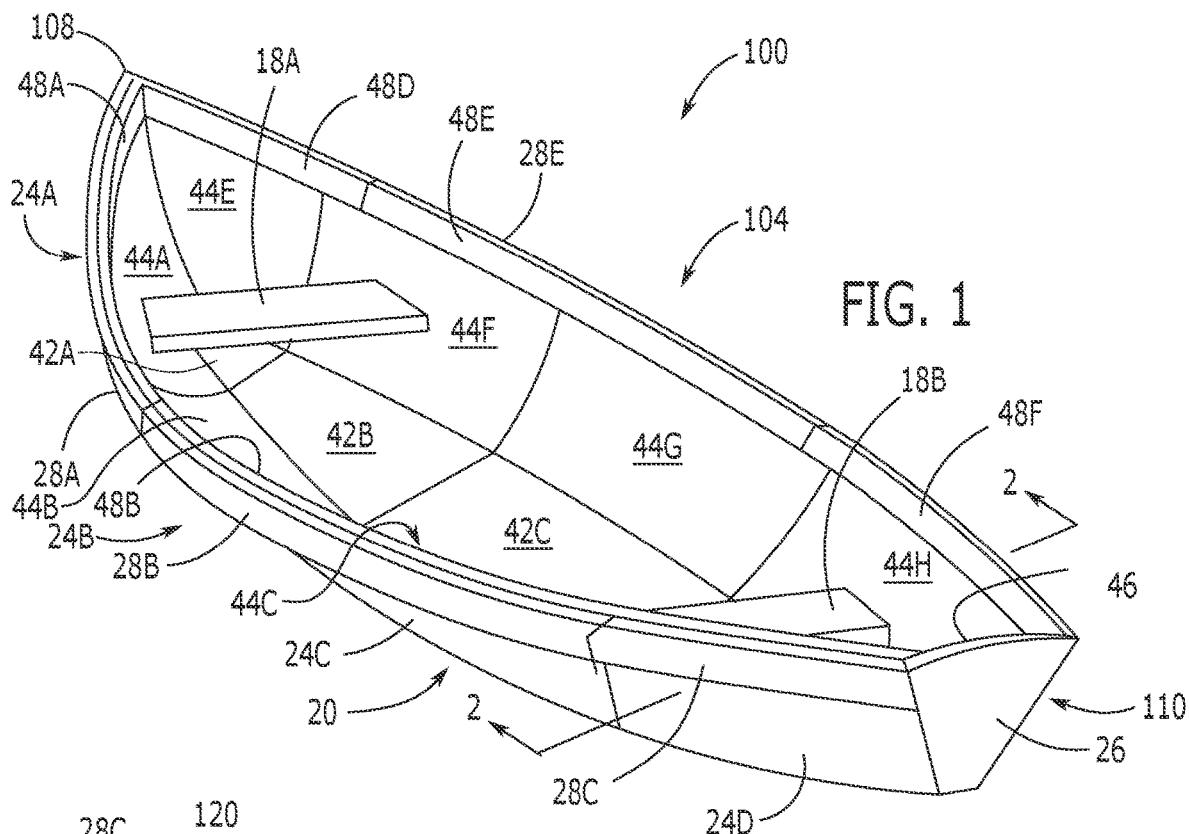
FIG. 1 is a perspective view of an aesthetically pleasing watercraft, in this case a boat, in accordance with a current embodiment of the present subject matter.

The boat of the present subject matter includes a deck having an inner layer or shell and an outer layer or shell, a stern having an inner layer or shell and an outer layer or shell, a starboard side having an inner layer or shell and an outer layer or shell, and a port side having an inner layer or shell and an outer layer or shell. A waterproof membrane or layer, preferably of rubber, is between the inner and the outer layer or shell of each of the deck, the stern or transom, the starboard side, and the port side. The inner layer or shell and the outer layer or shell protect the waterproof membrane from abrasion. The stern abuts a first edge margin of the deck. The starboard and port sides, disposed transverse to the stern, abut spaced-apart lateral edge margins of the deck. The edge margins of the port and starboard sides (which are spaced from the stern) abut to provide the bow or stem. The inner layer or shell and the outer layer or shell, of each of the deck and the starboard and port sides, include two or more individual sections or planks. The sides and bottom may be detached from each other and then broken down further into separate sections. The sections are each preferably no more than about 4 feet in length. The size of the boat is not limited by the length of individual pieces. Sections for the inner layer or shell and the outer layer or shell (for each of the port and starboard sides and the deck) are secured together by tongue-in-groove components pinned together seriatim. Joints remain unsealed.

The outer hull gives shape to the boat.

The inner hull matches the shape of the outer hull and provides attachment points for seating.

Spaced-apart lower edge margins (of the outer layers or shells) of the port and starboard sides are arranged longitudinally along spaced-apart lateral edge margins (of the outer layer or shell) of the deck. A lower edge margin (of the outer layer or shell) of the stern is arranged along a lower edge margin (of the outer layer or shell) of the deck disposed transverse to the port and starboard sides. A flexible, waterproof membrane or layer is disposed adjacent to an inside surface of the outer layer or shell of the port and starboard sides, atop the outer layer or shell of the deck, and adjacent to an inside surface of the outer layer or shell of the stern. An inner layer or shell of the port and starboard sides, the deck, and the stern are each assembled from two or more sections as described above. The inner layer or shell of the port and starboard sides, the deck, and the stern are disposed either adjacent to or atop the waterproof membrane or layer, thus sandwiching the waterproof layer between the inner layers or shells and the outer layers or shells of the components noted. The waterproof membrane or layer prevents water intrusion from the outer layer or shell into the inner layer or shell of the port and starboard sides, the deck, and the stern, and thus serves as a layer of fiberglass or paint as on traditional boats.

A gunwale, made of overlapping pieces fastened in sections, around an outer perimeter of the boat or watercraft, serves to bias the inner and outer shells together, to form a single vessel. The gunwale also adds stiffness to the assembled boat. The gunwale squeezes the shells together and holds the membrane in place.

Materials of manufacture are not limited. Each inner and outer layer or shell of components noted is preferably made from thin wooden layers, e.g., conventional 2¼" plywood sheets. The waterproof membrane or layer is preferably made of rubberized canvas. Plywood sections or planks, reduced in size from long sections to shorter sections, can be finished in a traditional style, e.g., stained and varnished, to be aesthetically pleasing.

Boat sides are preferably water permeable, because when disassembled into smaller sections (to be easier to handle, move, and store), it is desirable that the sections forming the sides, especially the port and starboards sides, not retain water. Water intrusion is prevented by the tough waterproof membrane sandwiched between the two hull sections. Because the outer hull is freed from preventing water intrusion into the boat, it may be made to be broken down into small, easily handled pieces.

The appearance and function of the boat are not particularly limited, and may conform to any currently available type, e.g., a dory or a beach skiff.

While the watercraft or boat of the present subject matter can be used for several traditional purposes, a dory is particularly suitable since dories are stackable.

In still other embodiments, the present subject matter can include two similar boats, each constructed of assorted components not sealed against water intrusion. One boat, a bit smaller than the other, fits therewithin. A flexible, waterproof membrane or layer, preferably manufactured from rubberized canvas or made of rubber, is secured between the boats to prevent fluid from flowing therebetween.

In all additional embodiments, oars, oarlocks, seats, outboard motors, and sailing rigs can easily be added to watercraft or boats of the present subject matter.

The watercraft or boat of the present subject matter can easily be stored in a closet or basement of a home. When use on water is desired, the sections are easily transported to a body of water in a trunk of a car. Once assembled, the boat will appear to be a traditionally constructed watercraft, with smooth sides and a finish comparable to a permanently assembled fiberglass boat sealed using epoxy resin.

The method of manufacture is not particularly limited. The manufacturer may build a boat hull according to a traditional method, (e.g., lofting, fitting planks, etc.) but divide each plank into smaller sections having interlocking tabs. The outer hull tabs are preferably on the inside of the hull and the inner hull tabs are preferably on the outside of the hull so that the tabs are hidden from view. The manufacturer may then build a second hull, identical to the first hull but slightly smaller. The manufacturer may fit a canvas cover to the outside of the second shell and impregnate it with a waterproof compound such as rubber or silicone to form a membrane. The second shell may be placed into the first shell with the membrane in between. An inner and outer gunwale may be fitted by glue-laminating overlapping pieces in place on the top edge of the inner and outer shell. The manufacturer may drill holes through the gunwale and bolt it in place with the fastener heads countersunk into the outer gunwale. Seat mounts may be fastened to the inner shell to which bench seats may be pinned in place from beam to beam at the front, center, and rear of the boat.

The method of use is not particularly limited. To use this boat, the individual pieces may be transported to a body of water where it is to be used. The boat may be assembled on site. The completed boat may be launched and used for transportation or recreation. After use, the boat may be broken down into individual pieces and transported to storage.

The following detailed description includes the best contemplated modes of carrying out exemplary embodiments of the present subject matter. The following description is therefore not to be taken in a limiting sense but rather is made merely for the purpose of illustrating the general principles of the present subject matter, since the scope of the present subject matter is best defined by the appended claims.

In a broad sense, one embodiment of the present subject matter is a boat comprising inner and outer shells, preferably wooden, with a waterproof membrane or layer sandwiched therebetween. The boat may be completely disassembled into smaller individual components, each no longer than a few feet in length, for transport and/or storage, while retaining the aesthetic appeal of traditionally constructed boats.

Figure 2:
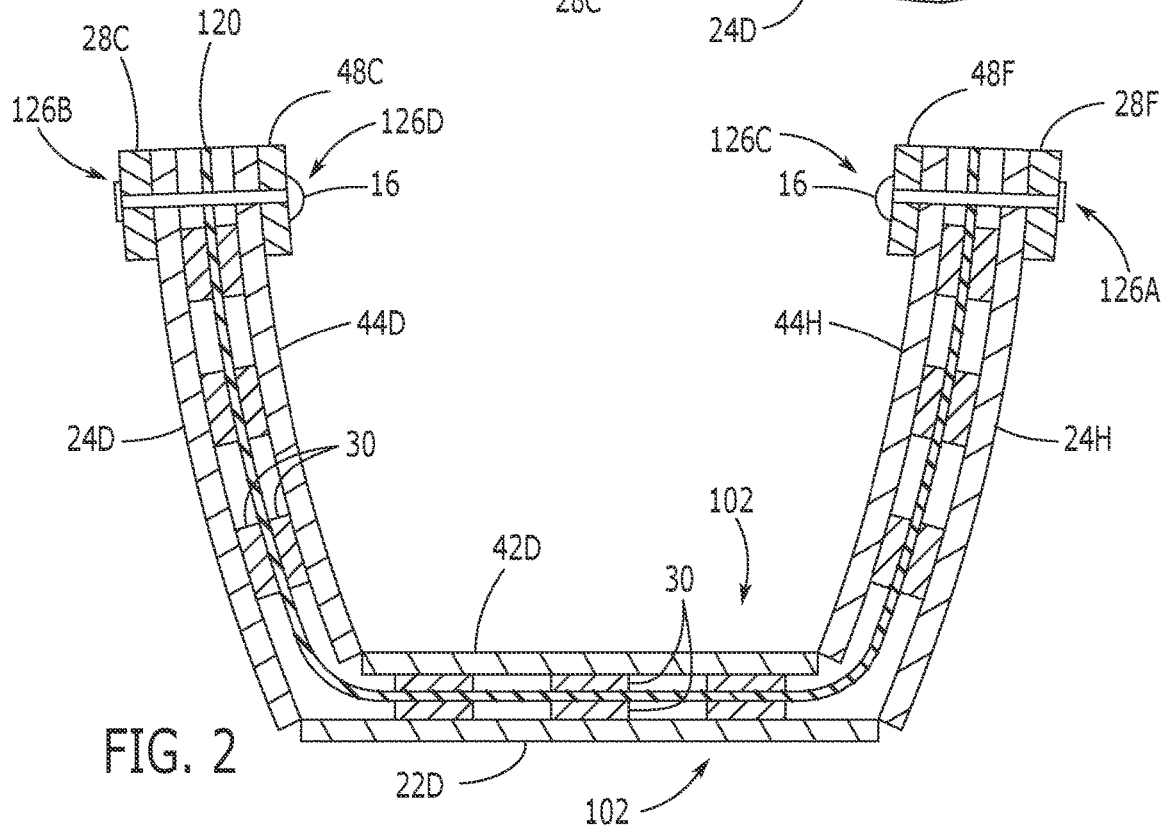
FIG. 2 is a cross-sectional view, on an enlarged scale relative to FIG. 1, from the plane 2-2 depicted in FIG. 1.
Figure 3:
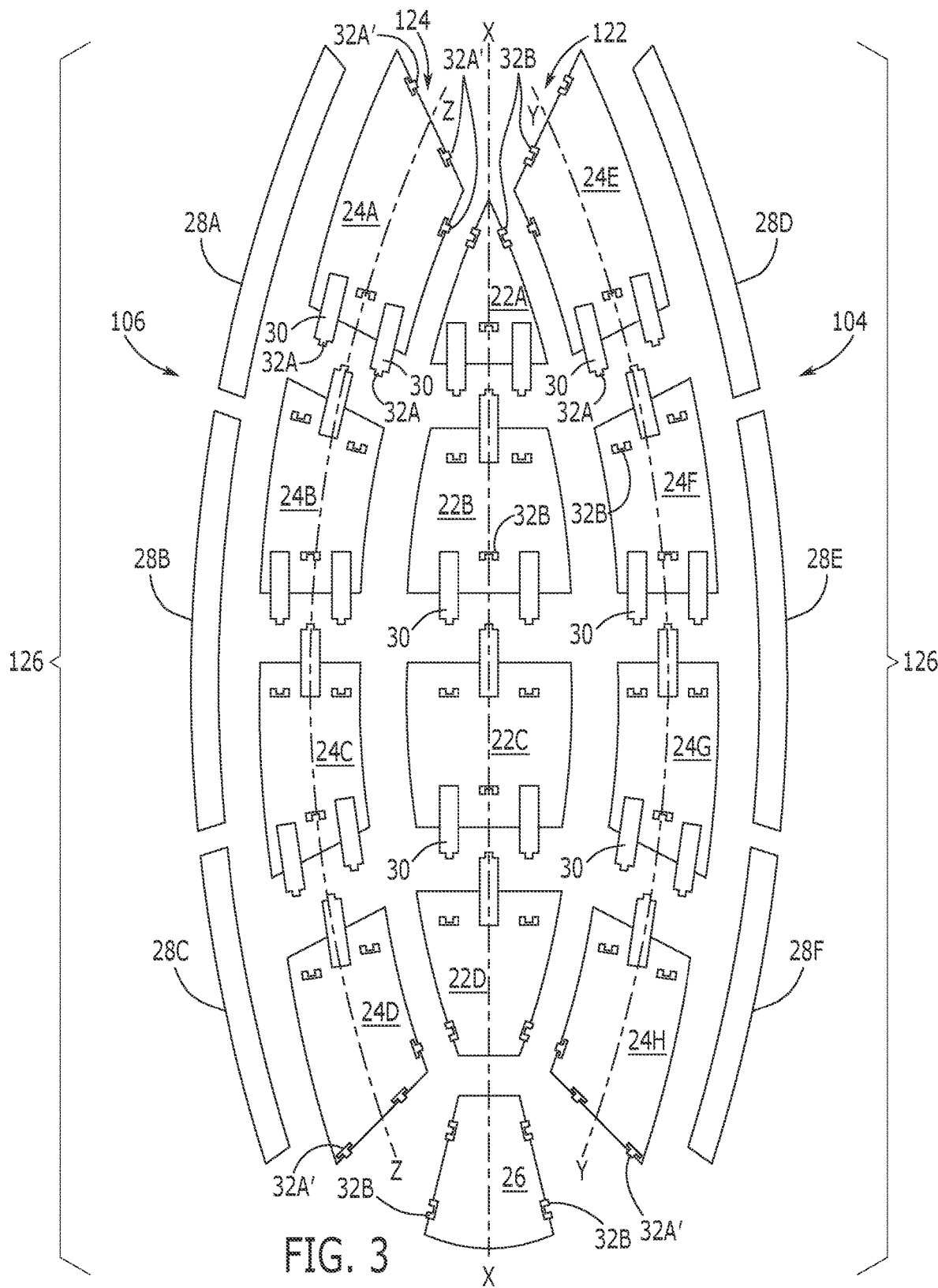
FIG. 3 is an exploded or disassembled top plan view of a portion of the components of the present subject matter, on an enlarged scale relative to FIG. 1.

Referring initially to FIGS. 1-3, one feature of the present subject matter is directed to a watercraft, e.g., a boat 100 (FIG. 1) that consists of an inner layer and an outer layer. The boat 100 comprises various components including a deck 102 (FIG. 2), a starboard side 104 (FIG. 1), a port side 106 (FIG. 3), a bow or STEM 108, and a STERN or transom 110 (FIG. 1). In the illustrated embodiment, the deck 102 includes an inner layer 42A, 42B, 42C (FIG. 1), 42D (FIG. 2) and an outer layer 22A, 22B, 22C, 22D (FIG. 3); the starboard side 104 includes an inner layer 44E, 44F, 44G, 44H (FIG. 1) and an outer layer 24E, 24F, 24G, 24H (FIG. 3); the port side 106 includes an inner layer 44A, 44B, 44C (FIG. 1), 44D (FIG. 2) and an outer layer 24A, 24B, 24C, 24D (FIG. 3); and the STERN 110 includes an inner layer 46 and an outer layer 26 (FIG. 1). A waterproof membrane or layer 120 (FIG. 2) is disposed between the inner and outer layers of the deck, the STERN, and the starboard and port sides.

In the illustrated embodiment, edge margins of adjacent inner and outer layers of the deck 102, the stern 110, and the starboard and port sides 104, 106 abut as follows. A first edge margin of the starboard side abuts a first edge margin of the deck. A first edge margin of the port side abuts a second edge margin of the deck. A first edge margin of the stern abuts a third edge margin of the deck. The first and second edge margins of the deck are disposed transverse to the third edge margin.

In the illustrated embodiment, a second edge margin of the starboard side outer layer 122 (FIG. 3) is spaced from the stern or transom 110 (FIG. 1); and a second edge margin of the port side outer layer 124 (FIG. 3) is also spaced from the stern 110, so that when the second edge margins of the starboard side outer layer 122 and the port side outer layer 124 abut, the bow 108 for the boat 100 is formed.

Referring again to FIGS. 1-3, another feature of the present subject matter will now be described. The boat 100 further comprises a gunwale 126 (FIG. 3) having an inner layer 48D, 48E, 48F (FIG. 1), 48A, 48B (FIG. 1), 48C (FIG. 2) and an outer layer 28D, 28E (FIG. 3), 28F (FIGS. 2, 3), 28A, 28B (FIG. 3), 28C (FIGS. 2, 3). The gunwale outer layer abuts a third edge margin of the starboard and port side outer layers spaced from the deck; and the gunwale inner layer abuts a third edge margin of the starboard and port side inner layers spaced from the deck. (See FIGS. 1, 2.)

In the illustrated embodiment of the present subject matter, the gunwale 126 (see FIG. 3) further includes a first gunwale section (starboard side of the boat) and a second gunwale section (port side), with the first and second gunwale sections each having an inner layer and an outer layer. A first gunwale section outer layer 126A (FIG. 2) abuts a third edge margin of the starboard side outer layer spaced from the deck 102. A second gunwale section outer layer 126B (FIG. 2) abuts a third edge margin of the port side outer layer spaced from the deck 102. A first gunwale section inner layer 126C (FIG. 2) abuts a third edge margin of the starboard side inner layer spaced from the deck 102. A second gunwale section inner layer 126D (FIG. 2) abuts a third edge margin of the port side inner layer spaced from the deck.

To achieve the above feature of the present subject matter, the boat 100 includes a first plurality of apertures located at spaced intervals between the bow 108 and stern 110. (While plural apertures are not shown in FIG. 1, two exemplary apertures appear in FIG. 2, both of which are the apertures through which each of two fasteners 16 are disposed.) The first plurality of apertures defines an associated first plurality of bores through the inner and outer layers of the first gunwale section, through inner and outer layers of the starboard side, and through the waterproof layer located between the inner and outer layers of the first gunwale section. Also, a second plurality of apertures is located along spaced intervals between the bow 108 and the stern 110. The second plurality of apertures defines an associated second plurality of bores through the inner and outer layers of the second gunwale section, through the inner and outer layers of the port side, and through the waterproof layer located between the inner and outer layers of the second gunwale section. (FIG. 2)

In particular, the watercraft, e.g., the boat 100 (FIG. 1) of the present subject matter in this manner includes plural fasteners located at spaced intervals between the bow 108 and the stern 110 (see, e.g., FIG. 1), to bias the gunwale inner and outer layers 48D, 48E, 48F (FIG. 1), 48A, 48B (FIG. 1), 48C (FIG. 2) (for inner layer segments) and 28D, 28E (FIG. 3), 28F (FIGS. 2, 3), 28A, 28B (FIG. 3), 28C (FIGS. 2, 3) (outer layer segments) together, with two such fasteners 16 shown in FIG. 2.

Referring next to FIGS. 1 and 3, still another feature of the present subject matter involving plural pieces, portions, or sections—of a deck, a starboard side, a port side—all sized and configured to be assembled and joined together when desired shall now be described. The present embodiment of the deck comprises a plurality of deck sections. Plural deck sections 42A, 42B, 42C, 42D (FIG. 1), 22A, 22B, 22C, 22D (FIG. 3) extend seriatim from bow 108 to stern 110. Each one of the plural deck sections is dimensioned and configured so that opposite edge margins of each one of the plural deck sections abut adjacent edge margins of a respective one of the plural starboard and port boat sides extending from the bow to the stern.

Figure 4:
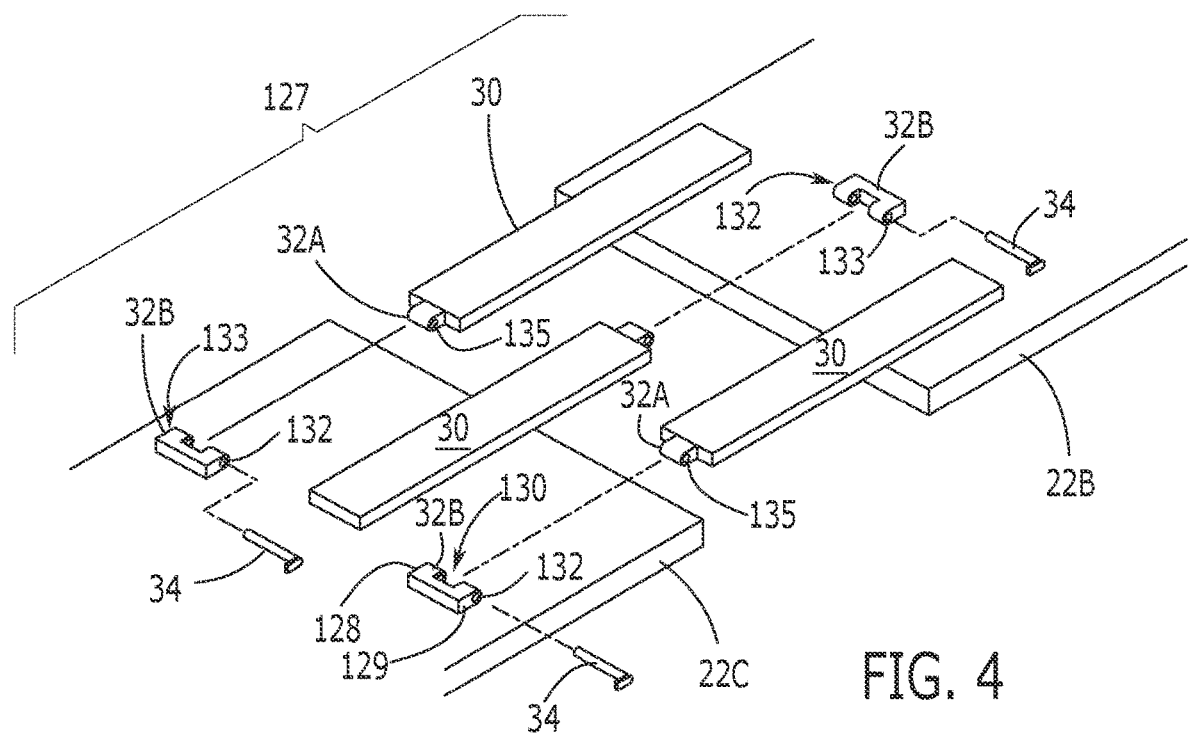
FIG. 4 is an exploded or disassembled perspective view of a portion of the components of the present subject matter, on an enlarged scale relative to FIG. 3.
Figure 5:
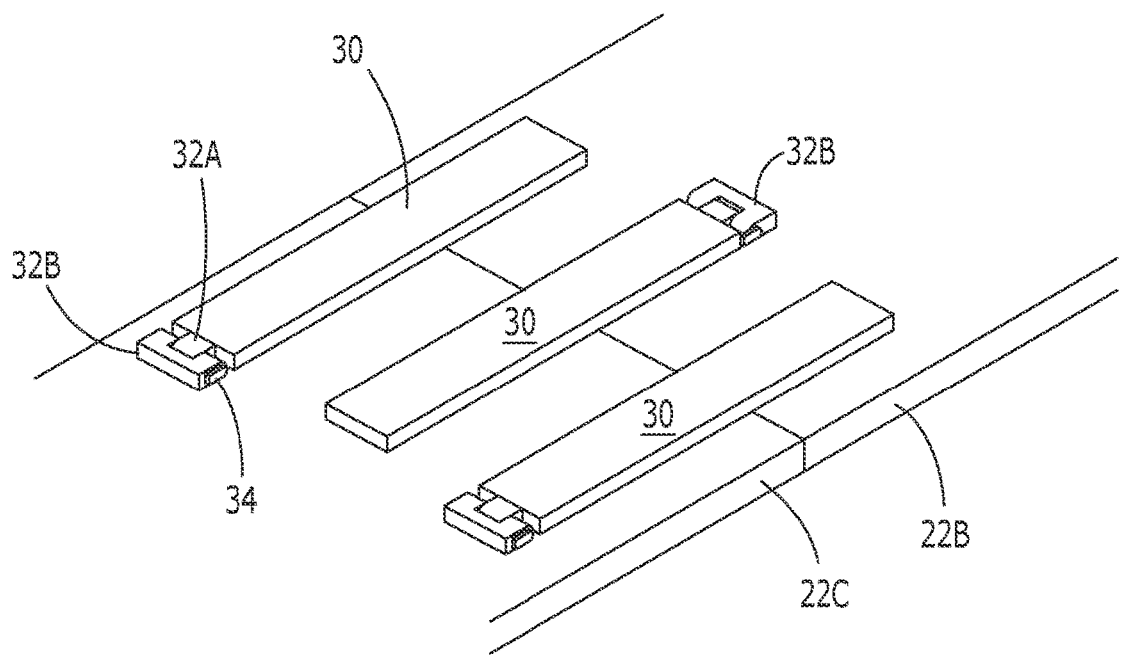
FIG. 5 is an assembled perspective view of a portion of the components of the present subject matter noted in FIG. 4, on an enlarged scale relative to FIG. 3.

A latching mechanism 127 (FIG. 4), for securing adjacent sections together, will next be described. Plural deck sections, arranged seriatim along a longitudinal axis X-X (FIG. 3), extend from the bow 108 to the stern 110 (FIG. 1). The latching mechanism comprises at least one first workpiece 32B (FIGS. 4, 5) secured to each of the plural sections. The latching mechanism 127, for each of the plural sections, includes at least one second workpiece 30 secured, e.g., to each of the plural deck sections. The first workpiece 32B (FIG. 4) includes a pair of spaced-apart sidewalls 128, 129 defining a recess 130 therebetween. For each of the plural deck sections, orientation of recess 130 defined by the first workpiece 32B and orientation of the second workpiece 30 are each along the longitudinal axis X-X (FIG. 3). The second workpiece 30 includes an extension 32A dimensioned and configured to fit within the recess 130 of an adjacent one of the plural deck sections (FIGS. 4, 5). The extension 32A extends along the axis X-X outwardly from the deck section to which the second workpiece 30 is secured toward an adjacent recess 130 (co-aligned along the longitudinal axis X-X) of a first workpiece 32B secured to an adjacent section. For plural deck sections, recesses 130 secured to the plural adjacent deck sections are co-aligned along the axis for enabling extensions to be insertable into recesses.

For the present embodiment, the latching mechanism 127 further includes a plurality of pins 34 (FIG. 4), each of which has a predetermined length and outer diameter. The first workpiece 32B further defines a pair of spaced-apart bores 132, 133 (FIG. 4) dimensioned and configured to receive one of the plural pins 34 inserted therein. The spaced-apart bores 132, 133 (formed through the sidewalls 128, 129) are co-aligned and are oriented transverse to the longitudinal axis X-X (FIG. 3). The second workpiece 30 defines another bore 135 (FIG. 4) through an extension 32A of a second workpiece 30 secured to an adjacent deck section. For a second workpiece extension 32A co-aligned with a first workpiece recess 130 (FIG. 4), the other bore 135 is disposed transverse to the longitudinal axis X-X (FIG. 3); and the other or second bore 135 is dimensioned and configured to receive therein one of the pins 34, as shown in FIG. 5. To assemble the deck, plural pins 34 are inserted through associated ones of each of the spaced-apart bores 128, 129 and an associated one of each of the plural bores 135, to secure adjacent deck sections together seriatim.

The following feature of the present embodiment secures deck sections to adjacent starboard side and/or port side sections of the boat 100. For this feature, the starboard side 104 (FIG. 1) and/or the port side 106 (FIG. 3) include a plurality of side sections (FIGS. 1, 3) and the latching mechanism 127 (FIG. 4), to secure adjacent sections together. Each side section extending seriatim from the bow 108 to the stern 110 (FIG. 1) defines an edge margin located adjacent the deck (FIG. 3).

The illustrated embodiment of the present subject matter involves securing the starboard side 104 (FIG. 1) and/or the port side 106 (FIG. 3) sections to the deck sections, for each of the inner and outer layers. The plural side sections are arranged seriatim along a curvilinear axis. That is, plural starboard side sections could be arranged seriatim from bow to stern along a first curvilinear axis Y-Y, with plural port side sections similarly arranged seriatim along a second curvilinear axis Z-Z, as shown in FIG. 3. The latching mechanism 127 includes components described above, except for the following differences. A structural variation of the second workpiece extension 32A (shown in FIGS. 4, 5), namely a "modified second workpiece extension" 32A' is shown secured to end sections of the starboard side and the port side, adjacent to each of the bow and stern, to enable first workpieces 32B secured to the starboard and the port side sections, spaced from the stern, to be pinned, as described above, to associated adjacent second workpiece extensions 32A', thereby to form the bow 108 (FIG. 1). For this embodiment, plural modified second workpiece extensions 32A' are secured to each of the starboard and the port side sections located adjacent the stern, and only first workpieces 32B are secured to the stern, for securing each of the starboard and port side sections to the stern.

Figure 6:
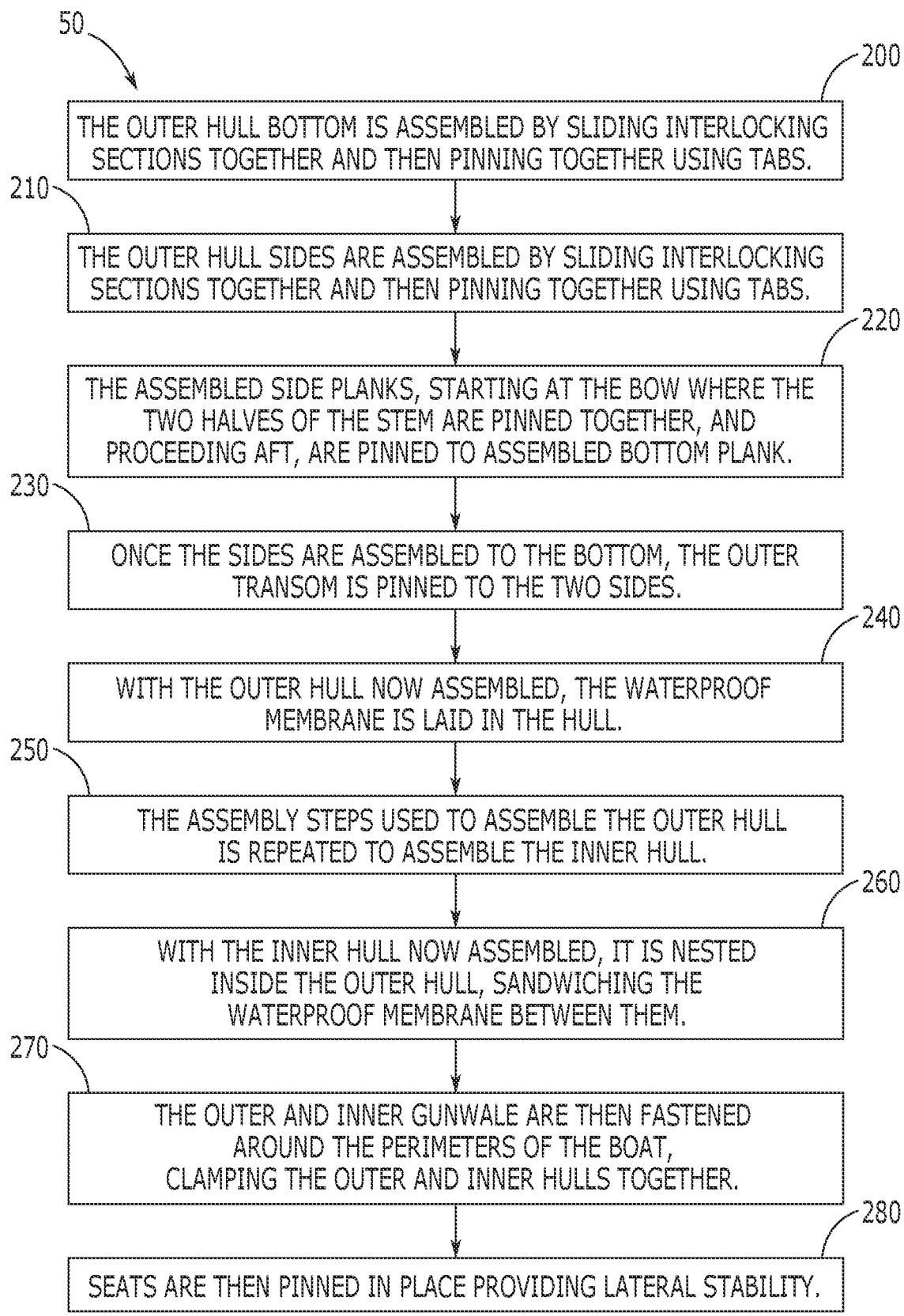
FIG. 6 is a flowchart of a method of assembly of the aesthetically pleasing watercraft or boat in accordance with an embodiment of the present subject matter.

An illustrative method 50 (FIG. 6) of assembling the boat 100 (FIG. 1) of the present embodiment shall now be described. First, the outer hull bottom is assembled by sliding small interlocking sections together and then pinning together using mechanical pins together to make one or more planks for each side and the bottom. (Step 200.) In this step, the phrase "the outer hull bottom" refers to the deck outer layer 22A, 22B, 22C, 22D (FIG. 3); and the phrase "sliding interlocking sections together and then pinning together" refers to sliding a workpiece 30 fixed to one section toward another workpiece 32B fixed to an adjacent section, with a projection 32A (on the workpiece 30) co-aligned with the recess 130 (formed in workpiece the 32B), followed by using a pin 34 to join adjacent sections together. (See FIGS. 4, 5.)

Next, the outer hull sides are assembled by sliding interlocking sections together and then pinning together using tabs. (Step 210.) In this step, the phrase "the outer hull sides" refers to the starboard side outer layer 24E, 24F, 24G, 24H (FIG. 3) and the port side outer layer 24A, 24B, 24C, 24D. Otherwise see step 200.

Then, the assembled side planks, starting at the bow where the two halves of the stem are pinned together, and proceeding aft, each piece pinned to the previous one, are pinned to the assembled bottom plank. (Step 220.) In this step, the phrase "the assembled side planks, starting at the bow where the two halves of the stem are pinned together, and proceeding aft" refers to pinning together, at the fore (of the boat), abutting end portions of the assembled starboard and port outer layers, to form the boat bow or stem, and then pinning the assembled starboard and port outer layers to the assembled deck, proceeding aft.

Once the sides are assembled to the bottom, the outer transom is pinned to the two sides. (Step 230.) In this step, the assembled outer layers of the starboard and port sides are pinned to the assembled outer layer of the deck or bottom, from fore to aft, and upon approaching the edge margins of the outer layer of the stern or transom, the outer layers of the starboard and port sides are pinned to the transom.

With the outer hull now assembled, the waterproof membrane is laid in the hull. (Step 240.) In this step, the assembled outer layers of the starboard and port sides have been pinned together at abutting fore edge portions to produce the bow, and were thereafter pinned to spaced-apart lateral edge margins of the assembled outer layers of the deck or bottom, from fore to aft, after which the lateral side edge margins of the stern or transom were pinned to aft edge margins of the outer layer of the starboard and port sides, thereby forming the outer hull (outer layer or shell), after which the waterproof membrane or layer is arranged within the hull (outer layer).

The assembly steps used to assemble the outer hull are repeated to assemble the inner hull. (Step 250.) In this step, procedures set forth above to assemble outer layers of the starboard and port sides, the deck or bottom, and the stern or transom, for producing the assembled outer layer, are repeated for producing the inner layer.

With the inner hull now assembled, inner hull is nested inside the outer hull, sandwiching the waterproof membrane between them. (Step 260.) In this step, the assembled inner layer is nested, on the waterproof membrane, within the outer layer.

The outer and inner gunwale are then fastened around the perimeters of the boat, clamping the outer and inner gunwales together. (Step 270.) In this step, the plural fasteners, located along upper edge margins of the starboard and port sides at spaced intervals between bow 108 and stern 110 (FIG. 1), bias gunwale inner and outer layers 48D, 48E, 48F (FIG. 1), 48A, 48B (FIG. 1), 48C (FIG. 2) (inner layer segments), 28D, 28E (FIG. 3), 28F (FIGS. 2, 3), 28A, 28B (FIG. 3), 28C (FIGS. 2, 3) (outer layer segments) together, with two such fasteners 16 being shown in FIG. 2.

Seats are then pinned in place providing lateral stability. (Step 280.) The seats also add stiffness to the assembled boat. In this step, a first seat 18A (FIG. 1), located near the bow 108, and a second seat 18B, located near the stern, can be pinned to inner surface portions of the starboard and port sides, to provide the boat 100 with strength and a boat user with lateral stability.

Several embodiments of the present invention are discussed below.

Embodiment 1 is a boat comprising:
a deck including an inner layer and an outer layer;
a starboard side including an inner layer and an outer layer, wherein an edge margin of the starboard side inner layer abuts a first edge margin of the deck inner layer, and wherein a first edge margin of the starboard side outer layer abuts a first edge margin of the deck outer layer;
a port side including an inner layer and an outer layer, wherein an edge margin of the port side inner layer abuts a second edge margin of the deck inner layer, and wherein a first edge margin of the port side outer layer abuts a second edge margin of the deck outer layer;
a stern including an inner layer and an outer layer, wherein an edge margin of the stern inner layer abuts a third edge margin of the deck inner layer, and wherein an edge margin of the stern outer layer abuts a third edge margin of the deck outer layer; and
a waterproof layer disposed between the inner and outer layers of the deck, the stern, and the starboard and port sides.

Embodiment 2 is the boat of embodiment 1, wherein the waterproof layer is a layer of rubber or rubberized canvas.

Embodiment 3 is the boat of embodiment 1, wherein a second edge margin of the starboard side outer layer is spaced from the stern, wherein a second edge margin of the port side outer layer is spaced from the stern, and wherein the second edge margins of the port side outer layer and the starboard side outer layer abut, for forming a bow for the boat.

Embodiment 4 is the boat of embodiment 3, including a gunwale having an inner layer and an outer layer, wherein the gunwale outer layer abuts a third edge margin of the starboard and port side outer layers spaced from the deck, and wherein the gunwale inner layer abuts a third edge margin of the starboard and port side inner layers spaced from the deck.

Embodiment 5 is the boat of embodiment 4, including a plurality of fasteners located at spaced intervals between the bow and the stern, to bias the gunwale inner and outer layers together.

Embodiment 6 is the boat of embodiment 3, including:
a first gunwale section and a second gunwale section, wherein the first and second gunwale sections each have an inner layer and an outer layer, wherein the first gunwale section outer layer abuts a third edge margin of the starboard side outer layer spaced from the deck, wherein the second gunwale section outer layer abuts a third edge margin of the port side outer layer spaced from the deck, wherein the first gunwale section inner layer abuts a third edge margin of the starboard side inner layer spaced from the deck, and wherein the second gunwale section inner layer abuts a third edge margin of the port side inner layer spaced from the deck;
a first plurality of apertures located at spaced intervals between the bow and the stern, wherein the first plurality of apertures defines an associated first plurality of bores:
through the inner and outer layers of the first gunwale section,
through the inner and outer layers of the starboard side, and
through the waterproof layer located between the inner and outer layers of the first gunwale section; and
a second plurality of apertures located at spaced intervals between the bow and the stern, wherein the second plurality of apertures defines an associated second plurality of bores:
through the inner and outer layers of the second gunwale section,
through the inner and outer layers of the port side, and
through the waterproof layer located between the inner and outer layers of the second gunwale section.

Embodiment 7 is the boat of embodiment 6, including a plurality of fastener means through the first and second plurality of bores, for securing the gunwale inner and outer layers together.

Embodiment 8 is a deck for a boat having a bow, a stern, a starboard and a port side, wherein the starboard and the port sides extend from the bow to the stern, the deck comprising:
a plurality of deck sections, wherein the plural deck sections extend seriatim from the bow to the stern, wherein each one of the plural deck sections is sized and configured so that opposite edge margins of the plural deck sections abut adjacent edge margins of each of the starboard and port sides from the bow to the stern; and
a latching mechanism for securing the plurality of sections together seriatim.

Embodiment 9 is the boat deck of embodiment 8, wherein the plural deck sections are arranged seriatim along an axis, and wherein the latching mechanism comprises:
at least one first workpiece secured to each one of the plural deck sections, wherein the at least one first workpiece has a pair of spaced-apart sidewalls defining a recess therebetween oriented along the axis; and at least one second workpiece secured to each one of the plural deck sections, wherein the at least one second workpiece includes an extension dimensioned and configured to fit within the recess of an adjacent one of the plural deck sections, and wherein the extension secured to each one of the plural deck sections and the recess secured to each one of the plural adjacent deck sections are aligned along the axis for enabling the extension to be insertable into the recess.

Embodiment 10 is the boat deck of embodiment 9, wherein each deck section is no more than about 4 feet in length.

Embodiment 11 is the boat deck of embodiment 10, wherein the latching mechanism includes a plurality of pins, each of the plural pins having a predetermined length and outer diameter,
wherein the at least one first workpiece further defines a pair of spaced-apart bores dimensioned and configured to receive one of the plural pins inserted therein, wherein the spaced-apart bores are disposed through the spaced-apart sidewalls, wherein the spaced-apart bores are co-aligned and disposed transverse to the axis;
wherein the at least one second workpiece defines a second bore through the extension of the at least one second workpiece secured to one of the plural deck sections, wherein the second bore is disposed transverse to the axis, wherein the second bore is sized and configured to receive therein the one of the plural pins, and
wherein each of the plural pins disposed through an associated one of each of the plural spaced-apart bores and an associated one of each of the plural second bores secure the plural deck sections together seriatim.

Embodiment 12 is a starboard side or a port side for a boat having a bow, a stern, and a deck, wherein the starboard side and the port side extend from the bow to the stern, and wherein the starboard side or the port side comprises:
a plurality of side sections, wherein the plural side sections extend seriatim from the bow to the stern, and wherein the plural side sections extending seriatim from the bow to the stern define an edge margin located adjacent the deck; and
a latching mechanism for securing the plurality of sections together seriatim.

Embodiment 13 is the boat side of embodiment 12, wherein each side section is no more than about 4 feet in length.

Embodiment 14 is the boat side of embodiment 13, wherein the plural side sections are arranged seriatim along a curvilinear axis, and wherein the latching mechanism comprises:
at least one first workpiece secured to each one of the plural side sections, wherein the at least one first workpiece has a pair of spaced-apart sidewalls defining a recess therebetween oriented along the curvilinear axis; and
at least one second workpiece secured to each one of the plural side sections, wherein the at least one second workpiece includes an extension dimensioned and configured to fit within the recess of an adjacent one of the plural side sections, and wherein the extension secured to each one of the plural side sections and the recess secured to each one of the plural adjacent side sections are co-aligned and oriented along the curvilinear axis for enabling the extension to be insertable into the recess.

Embodiment 15 the boat side of embodiment 14, wherein the latching mechanism includes a plurality of pins, each of the plural pins having a predetermined length and outer diameter, wherein the at least one first workpiece further defines a pair of spaced-apart bores dimensioned and configured to receive therein one of the plural pins, wherein the spaced-apart bores are disposed through the spaced-apart sidewalls, wherein the spaced-apart bores are aligned and disposed transverse to the curvilinear axis;

wherein the at least one second workpiece defines a second bore through the extension of the at least one second workpiece secured to each one of the plural side sections, wherein the second bore is dimensioned and configured to receive therein the one of the plural pins inserted, and wherein each of the plural pins disposed through an associated one of each of the plural spaced-apart bores and an associated one of each of the plural second bores secure the plural starboard side or plural port side sections together seriatim.

Embodiment 16 is a latching mechanism for a boat having a bow, a starboard side, and a port side, wherein the latching mechanism is used for securing the starboard side and the port side together, wherein the latching mechanism comprises:

at least one first workpiece secured adjacent the bow to one of the starboard and port sides, wherein the at least one first workpiece has a pair of spaced-apart sidewalls defining a recess therebetween;

at least one second workpiece secured adjacent the bow to the other of the starboard and port sides, wherein the at least one second workpiece includes an extension dimensioned and configured to fit within the recess, wherein the extension and the recess are co-aligned for enabling the extension to be insertable into and retractable from the recess; and at least one pin having a predetermined outer diameter and length, wherein the at least one first workpiece further defines a pair of spaced-apart bores sized and configured to receive therein the at least one pin, wherein the spaced-apart bores through the spaced-apart sidewalls are oriented along an axis, wherein the at least one second workpiece defines a second bore through the extension of the at least one second workpiece, wherein the second bore is oriented along the axis and is dimensioned and configured to receive therein the at least one pin, wherein the at least one pin disposed through the spaced-apart bores and through the second bore secures the starboard side and the port side together.

Embodiment 17 is a latching mechanism for a boat having a stern, a starboard side, and a port side, wherein the latching mechanism is used for securing the stern to one of the starboard and the port sides, wherein the latching mechanism comprises:

at least one first workpiece secured to the stern, wherein the at least one first workpiece has a pair of spaced-apart sidewalls defining a recess therebetween;

at least one second workpiece secured adjacent to the stern to the one of the starboard and port sides, wherein the at least one second workpiece includes an extension dimensioned and configured to fit within the recess, wherein the extension and the recess are co-aligned for enabling the extension to be insertable into and retractable from the recess; and at least one pin having a predetermined outer diameter and length, wherein the at least one first workpiece further defines a pair of spaced-apart bores sized and configured to receive therein the at least one pin, wherein the spaced-apart bores through the spaced-apart sidewalls are oriented along an axis, wherein the at least one second workpiece defines a second bore through the extension of the at least one second workpiece, wherein the second bore is oriented along the axis and is dimensioned and configured to receive therein the at least one pin, wherein the at least one pin when disposed through the spaced-apart bores and the second bore secures the stern to one of the starboard and port sides.

Embodiment 18 is a latching mechanism for a boat having a bow, a deck, a stern, a starboard side, and a port side, wherein the latching mechanism is used for securing the deck to one of the starboard and the port sides, and wherein the deck includes a fore deck section and an aft deck section, the latching mechanism comprising:

at least one first workpiece secured to one of the fore deck and the aft deck sections, wherein the at least one first workpiece has a pair of spaced-apart sidewalls defining a recess therebetween;

at least one second workpiece secured to the one of the starboard and port sides located adjacent to one of the fore deck and aft deck sections, wherein the at least one second workpiece includes an extension sized to fit within the recess, wherein the extension and the recess are co-aligned for enabling the extension to be insertable into and retractable from the recess; and at least one pin having a predetermined outer diameter and length, wherein the at least one first workpiece further defines a pair of spaced-apart bores sized and configured to receive therein the at least one pin, wherein the spaced-apart bores through the spaced-apart sidewalls are oriented along an axis, wherein the at least one second workpiece defines a second bore through the extension of the at least one second workpiece, wherein the second bore is oriented along the axis and is dimensioned and configured to receive therein the at least one pin, wherein the at least one pin when disposed through the spaced-apart bores and the second bore secures the deck to one of the starboard and port sides.

Embodiment 19 is a method of assembling a boat from boat sections, comprising:

assembling a bottom from a plurality of bottom sections having end portions by arranging the plural bottom sections seriatim such that all but two of the bottom section end portions abut and pinning abutting bottom section end portions together, wherein an assembled bottom comprises a pair of spaced-apart bottom end portions, a spaced-apart pair of bottom lateral edge margins, and a bottom aft end portion;

assembling a starboard side from a plurality of starboard side sections having end portions by arranging the plural starboard side sections seriatim such that all but two of the section end portions abut and pinning abutting section end portions together, wherein an assembled starboard side comprises a starboard side lateral edge margin and spaced-apart starboard side fore and aft end portions;

assembling a port side from a plurality of port side sections having end portions by arranging the plural port side sections seriatim such that all but two of the section end portions abut and pinning abutting section end portions together, wherein an assembled port side comprises a port side lateral edge margin and spaced-apart port side fore and aft end portions;

pinning the starboard and port side fore end portions together to form a bow;

pinning one of the starboard side and port side lateral edge margins to one of the pair of bottom lateral edge margins and the other of the starboard and port side lateral edge margins to the other of the pair of bottom lateral edge margins; and to a stern having three edge margins, two of which are spaced apart and the third of which is disposed transverse to each of the spaced-apart stern edge margins, pinning one of the starboard and port side aft end portions to one of the spaced-apart stern edge margins and pinning the other of the starboard and port side aft end portions to the other one of the spaced-apart stern edge margins and pinning the aft end portion of the bottom to the third edge margin of the stern.

Embodiment 20 is the method of assembling a boat of embodiment 19, further including the step of disassembling the assembled boat by unpinning the pinned boat sections.

What has been illustrated and described in this patent application is a boat comprising an outer layer, an inner layer, and a waterproof layer disposed therebetween. While the present subject matter has been described in connection with a current embodiment, described and illustrated herein, the present subject matter is not limited to the current embodiment. On the contrary, many alternatives, changes, and/or modifications will become apparent to those of ordinary skill in the field of the present subject matter after this application has been read. Therefore, all such alternatives, changes, and modifications are to be viewed as part of the present subject matter insofar as they fall within the spirit and scope of the invention as set forth in the following claims.

What is claimed is:

1. A boat comprising:
a hull including an inner layer and an outer layer, the hull comprising:
  a deck including an inner layer and an outer layer;
  a starboard side including an inner layer and an outer layer, wherein an edge margin of the starboard side inner layer abuts a first edge margin of the deck inner layer, and wherein a first edge margin of the starboard side outer layer abuts a first edge margin of the deck outer layer;
  a port side including an inner layer and an outer layer, wherein an edge margin of the port side inner layer abuts a second edge margin of the deck inner layer, and wherein a first edge margin of the port side outer layer abuts a second edge margin of the deck outer layer;
  a stern including an inner layer and an outer layer, wherein an edge margin of the stern inner layer abuts a third edge margin of the deck inner layer, and wherein an edge margin of the stern outer layer abuts a third edge margin of the deck outer layer; and
a waterproof layer disposed between the inner and outer layers of the hull.

2. The boat of claim 1, wherein the waterproof layer is a layer of rubber or rubberized canvas.

3. The boat of claim 1, wherein the second edge margins of the port side outer layer and the starboard side outer layer abut to form a bow of the boat.

4. The boat of claim 3, further comprising:
a gunwale having an inner layer and an outer layer, wherein the gunwale outer layer abuts a third edge margin of the starboard and port side outer layers spaced from the deck outer layer, and wherein the gunwale inner layer abuts a third edge margin of the starboard and port side inner layers spaced from the deck inner layer; and
a plurality of fasteners located at spaced intervals along a length of the gunwale between the bow and the stern, wherein said plurality of fasteners penetrate the gunwale inner layer, the gunwale outer layer, the hull inner layer, the hull outer layer, and the waterproof membrane and are operative to bias the gunwale inner and outer layers together.

* * * * *